United States Patent [19]
Richard

[11] 3,724,120
[45] Apr. 3, 1973

[54] DELAYED RELEASE DEVICE

[76] Inventor: Joseph D. Richard, 3613 Loguat Avenue, Miami, Fla. 33133

[22] Filed: Dec. 18, 1970

[21] Appl. No.: 99,606

[52] U.S. Cl. .................................. 43/100, 43/43.12
[51] Int. Cl. ............................................. A01k 93/00
[58] Field of Search ...................... 43/100, 43.12, 23

[56] References Cited

UNITED STATES PATENTS

| | | | |
|---|---|---|---|
| 3,426,472 | 2/1969 | Richard | 43/100 |
| 2,329,117 | 9/1943 | Henderson et al. | 43/43.12 |

*Primary Examiner*—Warner H. Camp

[57] ABSTRACT

An improved delayed release device comprising an expendable anode linkage and a re-usable cathode assembly for temporarily securing fishing gear beneath the sea surface. The highly corrosive anode member of the galvanic couple breaks after a predetermined period of immersion in seawater. Changes in corrosion rate due to variations in sea water conductivity are substantially reduced by including an electrical resistance between anode and cathode members of the couple.

1 Claim, 24 Drawing Figures

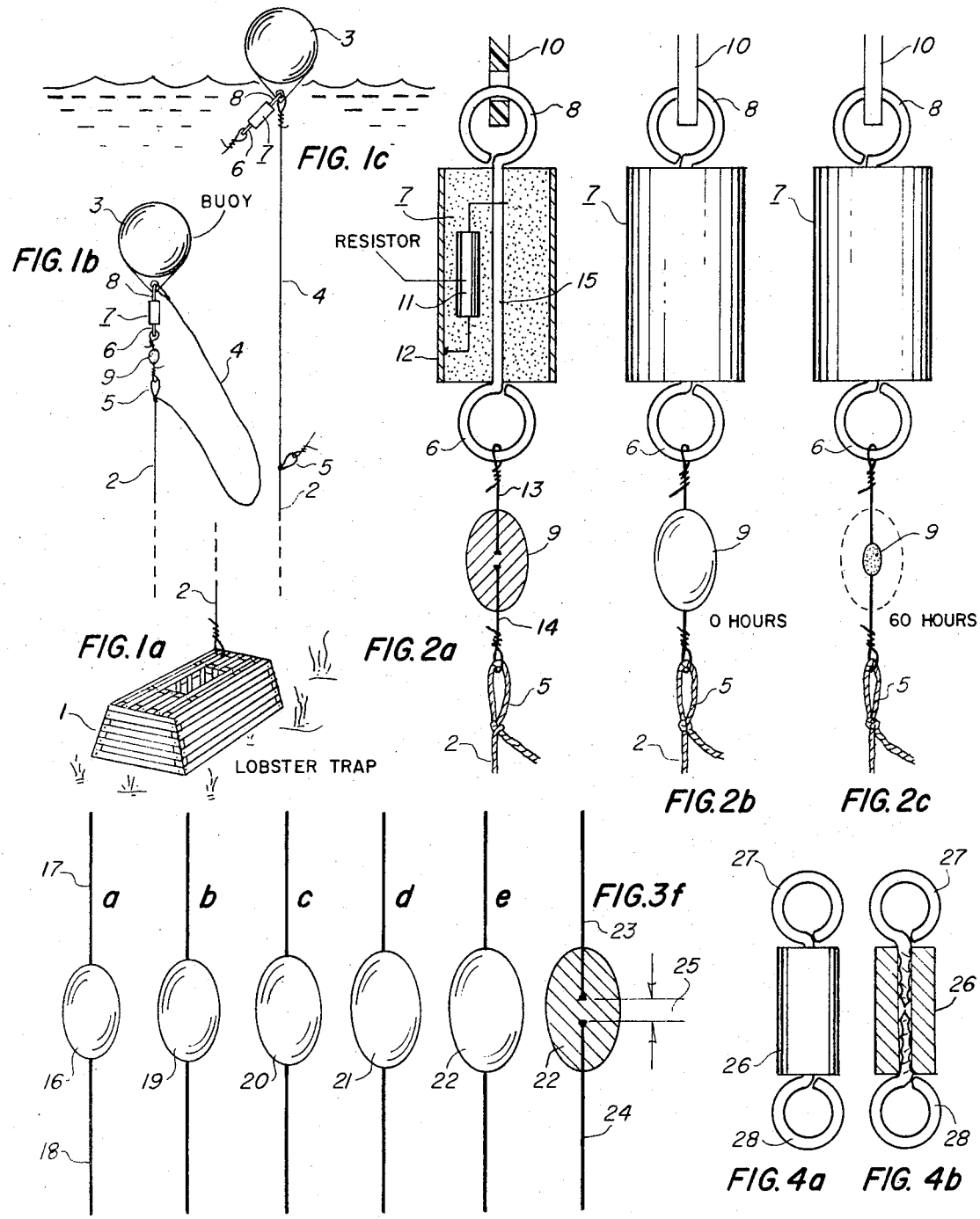

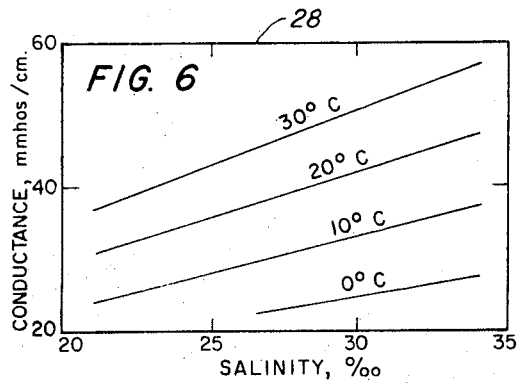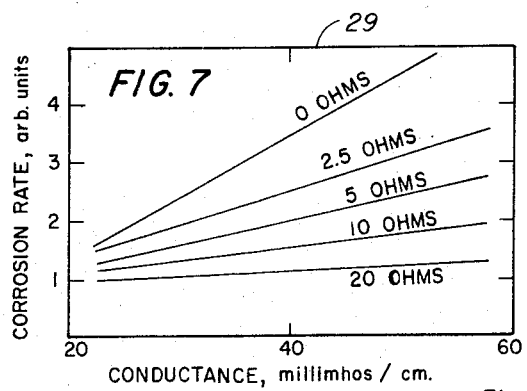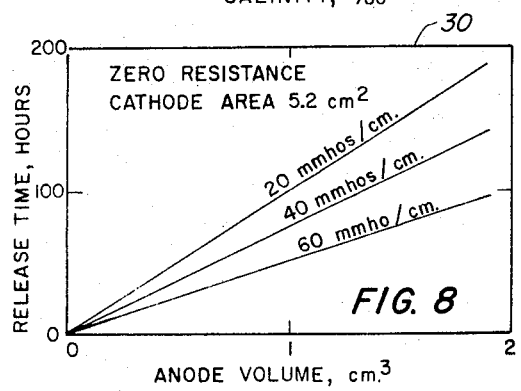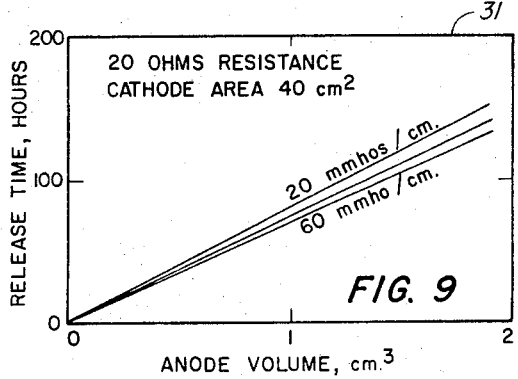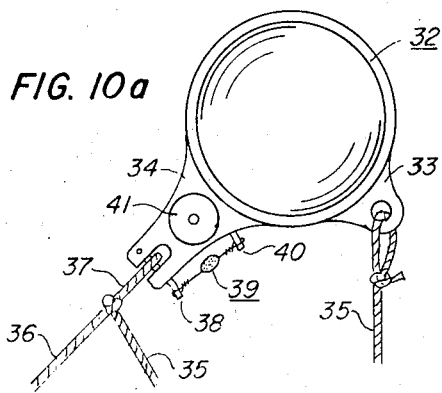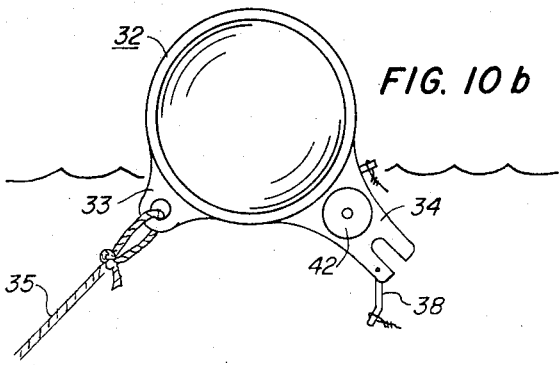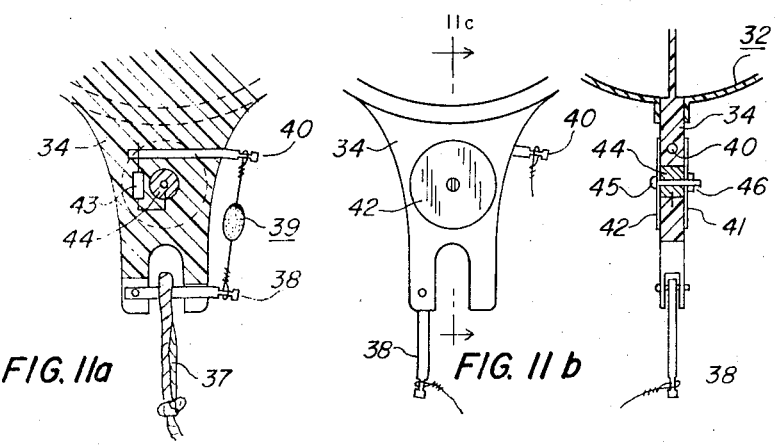

DELAYED RELEASE DEVICE

BACKGROUND OF THE INVENTION

In the past, a wide variety of traps have been used for the capture of fish, lobsters, and crabs. These traps almost invariable lie on the ocean floor and their recovery is effected by means of a line connected to a surface float or buoy. The surface float is almost essential for the relocation and recovery of the trap. However, the existence of an exposed surface float has made these traps subject widespread poaching. In the lobster fishing industry this problem has become particularly serious. In some areas more than half of the total catch is lost to poachers. In many of the less civilized coastal areas of the world, the poaching problem has completely frustrated all attempts to develop a trap fishing industry. In some countries the fisherman have partially overcome the problem by eliminating the float entirely. Thus the fishermen must rely on their memory to relocate their traps and on a long hooked pole to recover them. Of course this technique restricts the fishing to only the clear, shallow water areas and the deeper adjacent waters are not exploited.

SUMMARY OF THE INVENTION

The present invention provides an improved apparatus for securing fishing gear beneath the sea surface for a predetermined period of time. For example, the invention provides a means for concealing the float or buoy of a fish trap or the like beneath the surface for a predetermined period of time after setting. An expendable linkage device, including the highly corrosive anode section of a galvanic couple, is provided for temporarily shortening the line between float and trap so that the float is restrained beneath the surface. The linkage device breaks after a predetermined period of immersion thus allowing the float to rise to the surface so that the trap can be recovered.

The corrosion rate of the anodic linkage (and the corresponding delay period) is strongly affected by variations in the electrical conductance of seawater. The effect of seawater conductance on the corrosion rate of the anode is significantly reduced in the improved delayed release device described herein by the inclusion of an electrical resistor between the anode and the cathode members of the galvanic couple.

The expendable delayed release device consists of a galvanic couple arranged in a linkage configuration or in a release mechanism suitable for restraining a trap float beneath the surface. The anode and cathode sections are composed of metals (or metal alloys) widely separated in the electromotive series. When immersed in seawater, the high potential difference between the anode and cathode sections of the couple results in the relatively rapid corrosion of the anode section. After a certain period of time the anode section corrodes through and the linkage device breaks. With the proper selection of electrode materials, predictable and reproducible break times are obtained.

When electrical contact is made between two members of a galvanic couple immersed in seawater, current flows between them because of their potential difference. The more active (or less noble) metal is the anode where chemical oxidation takes place. The less active (or more noble) metal is the cathode where chemical reduction takes place. The closed circuit between the two results in the anode potential shifting in a more noble direction with a corresponding increase in the metal oxidation reaction and decrease in the reduction reaction. On the cathode, the potential shifts in the active direction with a corresponding decrease in the metal oxidation reaction and increase in the reduction reaction. The two metals polarize to about the same potential with the difference being equal to the IR drop through the seawater portion of the circuit. If polarization is sufficiently large, then for practical purposes all the oxidation reactions (all the corrosion) takes place at the anode member of the couple, and all the reduction reactions on the cathode member. Hydrogen discharge is the predominant cathode reaction. The rate of corrosion of the anode metal is, however, dependent on the ability of the cathode metal to allow the hydrogen discharge to proceed. When a magnesium anode and nickel cathode are electrically coupled and immersed in seawater, the following (somewhat simplified) reactions take place:

Oxidation (anode reaction)      $Mg = Mg^{++} + 2e$
In solution      $2H_2O = 2H^+ + 2OH^-$
In solution      $Mg^{++} + 2OH^- = Mg(OH)_2$
Reduction (cathode reaction)      $2H^+ + 2e = H_2\uparrow (gas)$ The combined reaction is:

$$Mg + 2H_2O = Mg(OH)_2 + H_2\uparrow (gas)$$

The standard electrode potentials at 25° C (in volts) are:

Magnesium ($Mg = Mg^{++} + 2e$)      −2.37
Nickel ($Ni = Ni^{++} + 2e$)      −0.25

In the above described galvanic couple, the magnesium anode corrodes and the nickel cathode receives cathodic protection. Hydrogen is evolved at both electrodes. When the magnesium alloy and cathodic metal are carefully chosen, as in the delayed release device, the combination of hydrogen evolution and even minimal water motion is sufficient to prevent the buildup of corrosion products on the electrode surfaces. Such corrosion products, if they persist and accumulate, can build up layers of high resistance between the electrodes so that the corrosion process is materially retarded. For this reason, only very specific metal and alloy combinations can be used if reasonably accurate and reproducible release times are to be achieved. The ratio of anodic and cathodic areas exposed to the seawater is an important factor in determining the reaction rate. Thus increasing the cathode area will increase the corrosion rate of the anode. In a preferred configuration of the delayed release device, the delay period (or break time) is established primarily by adjustment of the anode volume.

When the galvanic couple described above is incorporated into a linkage device and immersed in seawater, the expendable anode portion of the linkage will break through after a predetermined time interval. In addition to anode volume and cathode surface area, the internal and external resistances in the galvanic circuit are also controlling factors in determining the time interval. The internal resistance is essentially zero for galvanic couples in direct contact. The external resistance is dependent principally on the seawater conductivity.

Water temperature, salinity, dissolved oxygen, and velocity all affect the corrosion rate. Minimal water motion association with normal use in the sea is adequate to saturate the velocity effect. Increasing current velocities are therefore relatively inconsequential. Normally encountered dissolved oxygen variation can also be ignored in most marine fisheries. Salinity variation can be significant, particularly in or near estuaries. Decreasing salinity causes an increasing resistivity in the external (seawater) portion of the galvanic circuit. As seawater temperature generally varies over a considerable range, the temperature effects are most significant. Decreasing temperature also causes an increasing resistivity in the seawater portion of the galvanic circuit.

The present invention provides a means for damping out most of the effects of changing seawater conductance on the corrosion rate of the anode by substantially increasing the resistance of the internal portion of the galvanic circuit.

DESCRIPTION OF THE DRAWINGS

FIGS. 1a, 1b, and 1c show how an improved delayed release device according to the present invention can be used to restrain the float of a lobster trap beneath the sea surface for a predetermined period of time.

FIGS. 2a, 2b, and 2c show in detail the construction and use of one configuration of the improved release device.

FIGS. 3a through 3f show a series of expendable anodes of increasing volume for providing a variety of delay periods for the release device shown in FIG. 2.

FIG. 4a and 4b show an alternate construction for the expendable anode section of the delayed release device.

FIG. 5 shows the relationship between anode volume and average break time for the release device shown in FIG. 2.

FIG. 6 shows the relationship between temperature, salinity, and conductance for seawater.

FIG. 7 shows the relationship between inter-electrode resistance of a galvanic couple, corrosion rate of the anode, and seawater conductance.

FIG. 8 shows the relationship between release time of a delayed release device, seawater conductance, and anode volume when the inter-electrode resistance is zero.

FIG. 9 shows the relationship between release time of a delayed release device, seawater conductance, and anode volume when the inter-electrode resistance is 20 ohms.

FIG. 10a and 10b show a delayed release device incorporated into a float and release mechanism.

FIGS. 11a, 11b, and 11c show details of the float and release mechanism shown in FIG. 10.

DESCRIPTION OF THE PREFERRED EMBODIMENT

Referring to FIGS. 1a and 1b, a lobster trap 1 is shown connected to the float 3 by means of a line having a lower portion 2 and upper portion 4. A loop 5, preferably a slip knot, in the lower portion 2 of the line is fastened to the float 3 by means of the expendable anode member 9 and the cathode assembly 7. At least a part of the upper portion 4 of the line hangs freely in the water and the float 3 is restrained beneath the surface. FIG. 1c shows the float 3 on the surface after the anode 9 has been corroded away by galvanic action.

FIG. 2a shows a sectional view of the cathode assembly 7 and expendable anode 9. A first wire 14 imbedded in the anode 9 attaches to the loop 5 in the lower portion 2 of the line. A second wire 13 imbedded in the anode 9 attaches to the electrically conductive lower ring 6 of the cathode assembly 7. An upper ring 8 of the cathode assembly 7 is attached to the float 3 by means of the fitting 10. The outer surface of the cylindrical body of the cathode assembly 7 consists of a metal cathode 12. An electrical resistor 11 connects the cathode 12 to the rod 15 and the lower ring 6. The cylindrical body of the cathode assembly 7 is filled with an insulating material. Thus the anode 9 is connected to the cathode 12 through the resistor 11. FIG. 2b shows the improved delayed release device immediately after immersion in seawater. FIG. 2c shows the device 60 hours after immersion in seawater. The anode 9 has greatly decreased in volume so that the imbedded wires are on the verge of separation.

FIG. 3a shows a relatively small anode 16 with upper and lower imbedded wires 17 and 18. FIGS. 3b through 3e shows increasingly larger anodes 19 through 22 suitable for increasingly longer delay periods for the release device described in FIG. 2. FIG. 3f shows a sectional view of an anode 22 with imbedded wires 23 and 24. The spacing 25 between the ends of the imbedded wires can be adjusted during the manufacturing process to provide a minor adjustment of the break time. The break time can be decreased by increasing the separation spacing 25. Conversely, the break time can be increased by decreasing the spacing 25. However, the principal means for varying the break time for the expendable anode section of the release device is by increasing the anode volume as shown in FIGS. 3a through 3e.

FIGS. 4a and 4b show an alternate construction for the expendable anode section. Screw eyes 27 and 28 are fitted tightly into the axial bore of the cylindrical anode 26.

FIG. 5 shows the relationship between break time and anode volume for the delayed release device shown in FIG. 2 having a cathode area of 40 cm². Either increasing the resistance between anode and cathode or decreasing the cathode surface area will increase the break time of the release device.

FIG. 6 consists of a graph 28 showing the relationship between temperature, salinity, and electrical conductance for sea water.

FIG. 7 consists of a graph 29 showing the relationship between corrosion rate of the anode and seawater conductance when various resistances are connected between the members of the galvanic couple.

FIG. 8 consists of a graph 30 showing the relationship between release time of a delayed release device, seawater conductance, and anode volume when the electrical resistance between members of the galvanic couple is zero. A relatively small cathode area is used.

FIG. 9 consists of a graph 31 showing the relationship between release time of a delayed release device, seawater conductance, and anode volume when the electrical resistance between members of the galvanic couple is 20 ohms. A relatively large cathode area is used.

FIG. 10a shows a float assembly 32 restrained beneath the surface by means of the line 36. A loop 37 in the line is held by the hinged release pin 38 so that the upper portion 35 of the line hangs freely in the water. An expendable anode 39, as described in FIG. 3, secures the free end of the release pin 38 to the electrically conductive tie post 40. The tie post 40 is connected to the cathode disks 41 and 42 by means of a resistor mounted within the appendage 34 of the float assembly 32. Thus the anode 39 and the cathodes 41 and 42 are electrically connected through a resistor so that the anode corrodes at a predetermined rate. FIG. 10b shows the float assembly 32 on the surface after the anode wires have separated. The line 35 is secured to the float assembly 32 by means of the fitting 33. The release pin 38 is shown in the open position.

FIGS. 11a, 11b, and 11c show detailed sectional and plan views of the release mechanism comprising a portion of the float assembly shown in FIG. 10. The appendage 34 has a cylindrical metal core 44 extending to both surfaces as shown in FIG. 11c. Cathode disks 41 and 42 are bolted to the metal core 44 by means of the bolt 45 and the nut 46. The tie post 40 is anchored firmly in the appendage 34. A resistor 43 connects the tie post 40 to the metal core 44. The loop 37 is secured by the release pin 38 which is held in the closed position by the expendable anode 39. FIGS. 11b and 11c show the release pin 38 after the anode 39 has broken thus releasing the loop 37.

Various metal and alloy combinations are suitable as electrode materials for the delayed release device. Nickel (or nickel plating) is satisfactory for the cathode. The magnesium alloy AZ 31B is satisfactory for the anode material. AZ 31B is a commercially available magnesium alloy having a composition of about 3 percent magnesium, 1 percent zinc, and 0.2 percent manganese. Galvanized (zinc coated) wire is suitable for the tie wires imbedded in the anode. A die casting process would normally be used to produce the anodes shown in FIGS. 2 and 3. A screw machine process would normally be used to produce the anode shown in FIG. 4.

As an alternative to the use of a conventional electrical resistor between the anode and cathode, a resistor having a large positive temperature coefficient could be used to more effectively compensate for variations in seawater temperature.

FIGS. 1 and 10 show a method of using the release device wherein a bight (or loop) in the float mooring line is stopped off. The slack loop hangs freely in the water and this presents no problems when the length of the loop is not excessive. As an alternative, however, the slack line can be coiled around a float having a spool shaped configuration or else a separate storage reel (or spool) can be provided beneath a conventionally shaped float.

It is understood that many modifications are possible and the invention is not limited to the specific embodiments disclosed nor otherwise except as set forth in the following claims.

What is claimed is:

1. A latching device of the character described suitable for securing fishing gear and the like beneath the sea surface for a predetermined period of time comprising: a latching mechanism; a metallic cathode member attached to said latching mechanism; an expendable anode member, having a magnesium alloy body with a pair of wires imbedded therein and extending therefrom, for temporarily fastening the said latching mechanism; and an electrical resistor connected between the said cathode and anode members to substantially reduce the effect of varying seawater conductance on the corrosion rate of the said anode member.

* * * * *